US009570951B2

United States Patent
Yamaguchi et al.

(10) Patent No.: US 9,570,951 B2
(45) Date of Patent: Feb. 14, 2017

(54) ROTARY ELECTRIC MACHINE UNIT

(71) Applicant: HONDA MOTOR CO., LTD., Tokyo (JP)

(72) Inventors: Tadashi Yamaguchi, Wako (JP); Masashi Inoue, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 190 days.

(21) Appl. No.: 14/615,356

(22) Filed: Feb. 5, 2015

(65) Prior Publication Data

US 2015/0236577 A1    Aug. 20, 2015

(30) Foreign Application Priority Data

Feb. 14, 2014 (JP) ................. 2014-026728

(51) Int. Cl.
H02K 47/00 (2006.01)
H02K 3/28 (2006.01)
H02K 3/12 (2006.01)
H02K 51/00 (2006.01)

(52) U.S. Cl.
CPC .......... *H02K 3/28* (2013.01); *H02K 3/12* (2013.01); *H02K 51/00* (2013.01)

(58) Field of Classification Search
CPC ........ H02K 47/04; H02K 47/14; H02K 47/16; H02K 47/20; H02K 47/24; H02K 3/04
USPC ............... 310/112–113, 179–180, 184, 194, 201,310/208
See application file for complete search history.

(56) References Cited

U.S. PATENT DOCUMENTS

| 4,663,536 A * | 5/1987 | Roesel, Jr. ............. H02P 9/10 290/45 |
| 5,281,879 A * | 1/1994 | Satake ................. H02K 16/00 310/114 |
| 5,838,085 A * | 11/1998 | Roesel, Jr. ............. F02N 11/04 310/112 |
| 8,174,159 B2 * | 5/2012 | Xu ......................... H02K 3/28 310/179 |
| 8,471,428 B2 * | 6/2013 | Naganawa ............. H02K 3/28 310/184 |
| 2014/0285056 A1 * | 9/2014 | Tomohara ............. H02K 3/12 310/208 |

FOREIGN PATENT DOCUMENTS

WO    WO 2009/128288    10/2009

* cited by examiner

*Primary Examiner* — Thanh Lam
(74) *Attorney, Agent, or Firm* — Mori & Ward, LLP

(57) ABSTRACT

A rotary electric machine apparatus includes a drive motor and a power generator. The drive motor and the power generator each include a stator. The stator includes a stator core and stator coils. The stator core has a plurality of slots which extend through the stator in an axis direction of the stator and which are disposed in a circumferential direction of the stator with a predetermined interval. The stator coils for a plurality of phases are each disposed in the plurality of slots as a distributed winding. The drive motor is provided such that a shift direction of the stator coils and a torque direction of the drive motor are opposite to each other. The power generator is provided such that the shift direction of the stator coils and a torque direction of the power generator are a same as each other.

7 Claims, 7 Drawing Sheets

ROTARY ELECTRIC MACHINE UNIT

CROSS-REFERENCE TO RELATED APPLICATIONS

The present application claims priority under 35 U.S.C. §119 to Japanese Patent Application No. 2014-026728, filed Feb. 14, 2014, entitled "Rotary Electric Machine Unit." The contents of this application are incorporated herein by reference in their entirety.

BACKGROUND

1. Field

The present disclosure relates to a rotary electric machine unit.

2. Description of the Related Art

An attempt to improve fuel consumption in drive devices for hybrid vehicles has been made by providing two motors, which are a drive motor and a power generating motor, as a hybrid system (for example, see International Publication No. WO 2009/128288). In such drive devices, in order to improve performance, the drive motor and the power generating motor may have the same cross-sectional shape in the axis direction of the stator including coil arrangement in the slots, that is, the cross-sectional shape of the electromagnetic sections when coils of the stators are wound in the same manner in the slots.

SUMMARY

According to one aspect of the present invention, a rotary electric machine unit includes two rotary electric machines, which are a drive motor and a power generator. Each rotary electric machine includes a stator. The stator includes a stator core having a plurality of slots which penetrate in an axis direction and are disposed in a circumferential direction with a predetermined interval therebetween, and stator coils of a plurality of phases that are each disposed in the plurality of slots as a distributed winding. The stator coils of the respective phases include outer peripheral winding sections which are housed in an outer peripheral side of a predetermined number of the slots and inner peripheral winding sections which are housed in an inner peripheral side of a predetermined number of the slots. The outer peripheral winding section and the inner peripheral winding section share the slot and the inner peripheral winding sections are shifted with respect to the outer peripheral winding sections by at least 1 slot in a predetermined direction as seen from one side in the axis direction. The drive motor is configured such that a shift direction of the stator coils and a torque direction of the drive motor are opposite to each other, and the power generator is configured such that the shift direction of the stator coils and a torque direction of the power generator are the same as each other.

According to another aspect of the present invention, a rotary electric machine apparatus includes a drive motor and a power generator. The drive motor and the power generator each include a stator. The stator includes a stator core and stator coils. The stator core has a plurality of slots which extend through the stator in an axis direction of the stator and which are disposed in a circumferential direction of the stator with a predetermined interval. The stator coils for a plurality of phases are each disposed in the plurality of slots as a distributed winding. The stator coils include outer peripheral windings housed in an outer peripheral side of a predetermined number of the plurality of slots and inner peripheral windings housed in an inner peripheral side of a predetermined number of the plurality of slots. The outer peripheral windings and the inner peripheral windings share the plurality of slots. The inner peripheral windings are shifted with respect to the outer peripheral windings by at least one slot in a predetermined direction as seen from one side in the axis direction. The drive motor is provided such that a shift direction of the stator coils and a torque direction of the drive motor are opposite to each other. The power generator is provided such that the shift direction of the stator coils and a torque direction of the power generator are a same as each other.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
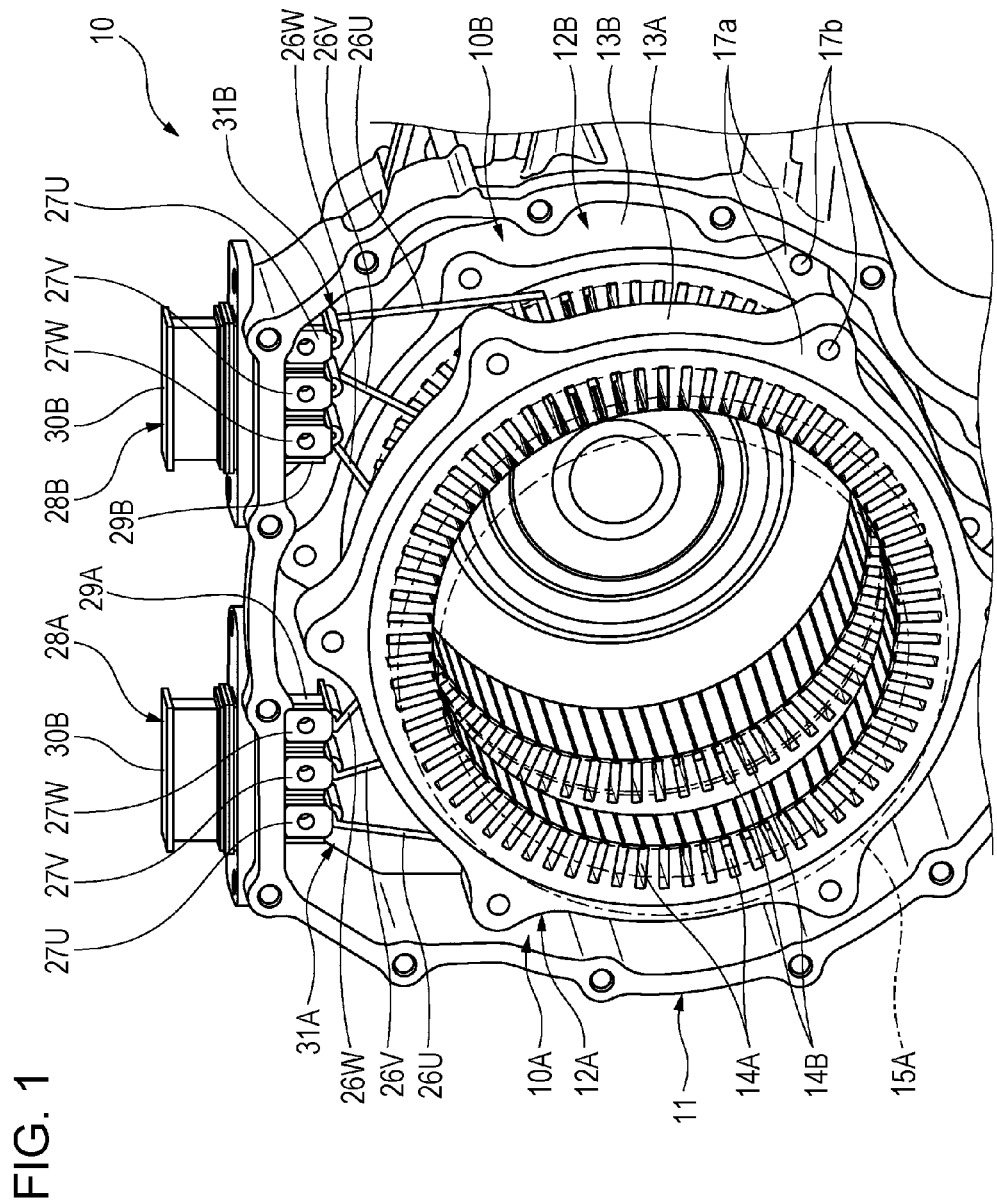
FIG. 1 is a perspective view of a stator of a rotary electric machine unit according to the disclosure.

The embodiments will now be described with reference to the accompanying drawings, wherein like reference numerals designate corresponding or identical elements throughout the various drawings.

A rotary electric machine unit according to one embodiment of the disclosure will be described below with reference to the accompanying drawings. The drawings are to be viewed in the direction in which the reference numerals are oriented.

Figure 2:
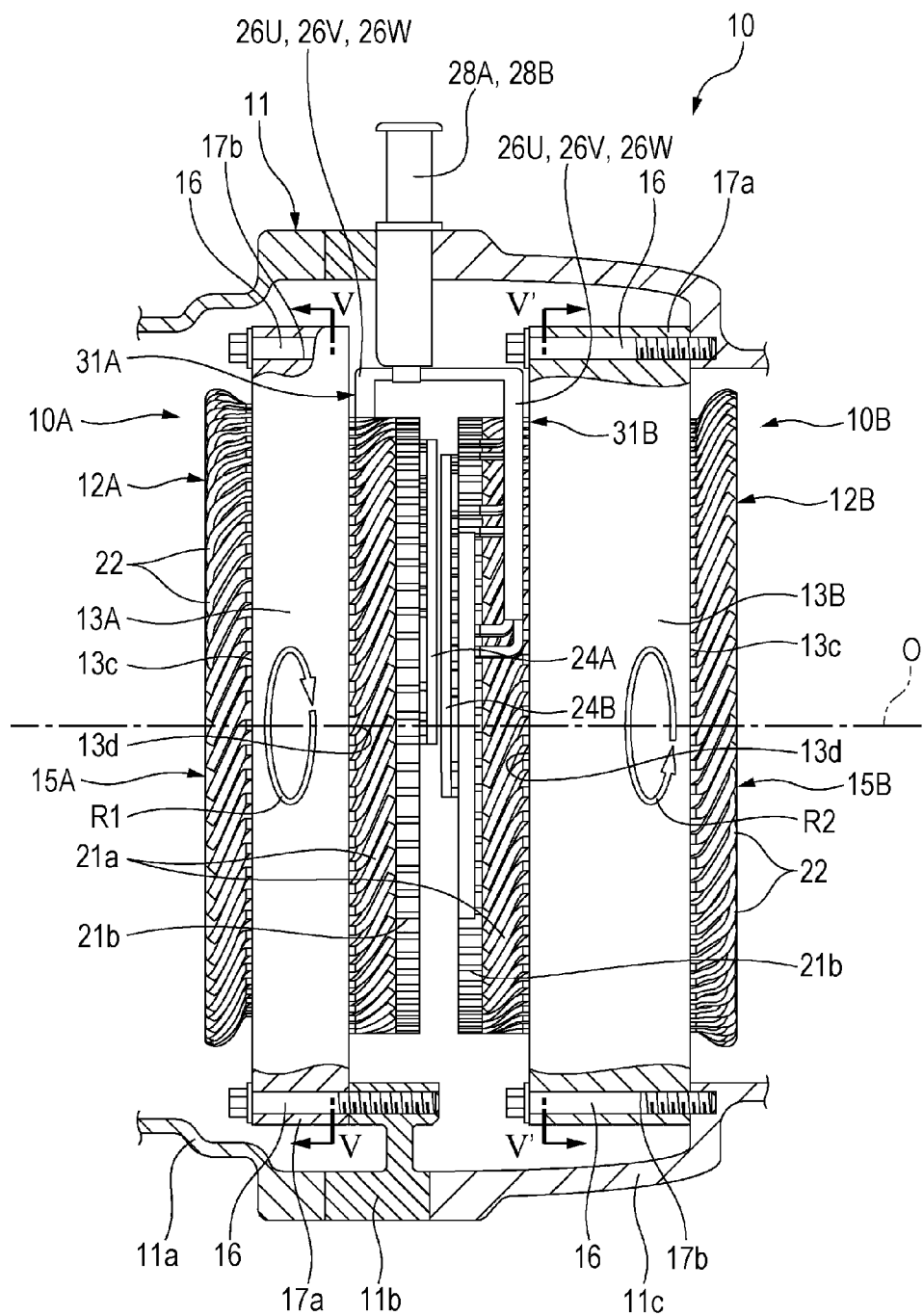
FIG. 2 is a vertical sectional view of the stator shown in FIG. 1.

As shown in FIGS. 1 and 2, the rotary electric machine unit 10 of this embodiment includes the generator 10A and the motor 10B which are housed in a casing 11 so as to face each other in the axis direction. The generator 10A and the motor 10B include stators 12A, 12B and rotors 40A, 40B which are rotatably disposed in the stators 12A, 12B, respectively (see FIG. 5).

The stator 12A of the generator 10A includes the stator core 13A having a plurality of slots 14A which penetrate in the axis direction and are disposed in the circumferential direction with a predetermined interval therebetween, and the stator coils 15A (15Au, 15Av, 15Aw) of a plurality of phases (for example, U-phase, V-phase, W-phase) which are housed in the slots 14A. The stator 12B of the motor 10B includes the stator core 13B having a plurality of slots 14B which penetrate in the axis direction and are disposed in the circumferential direction with a predetermined interval therebetween, and stator coils 15B (15Bu, 15Bv, 15Bw) of a plurality of phases (for example, U-phase, V-phase, W-phase) which are housed in the slots 14B.

As shown in FIG. 2, the casing 11 is formed of a left case portion 11*a*, an intermediate case portion 11*b* and a right case portion 11*c*. The stator core 13A is fixed to the intermediate case portion 11*b* by inserting bolts 16 into bolt holes 17*b* which are formed in a plurality of mounting sections 17*a* that project in the radius direction. Further, the stator core 13B is fixed to the right case portion 11*c* by inserting the bolts 16 into the bolt holes 17*b* which are formed in the plurality of mounting sections 17*a* that project in the radius direction.

Figure 3:
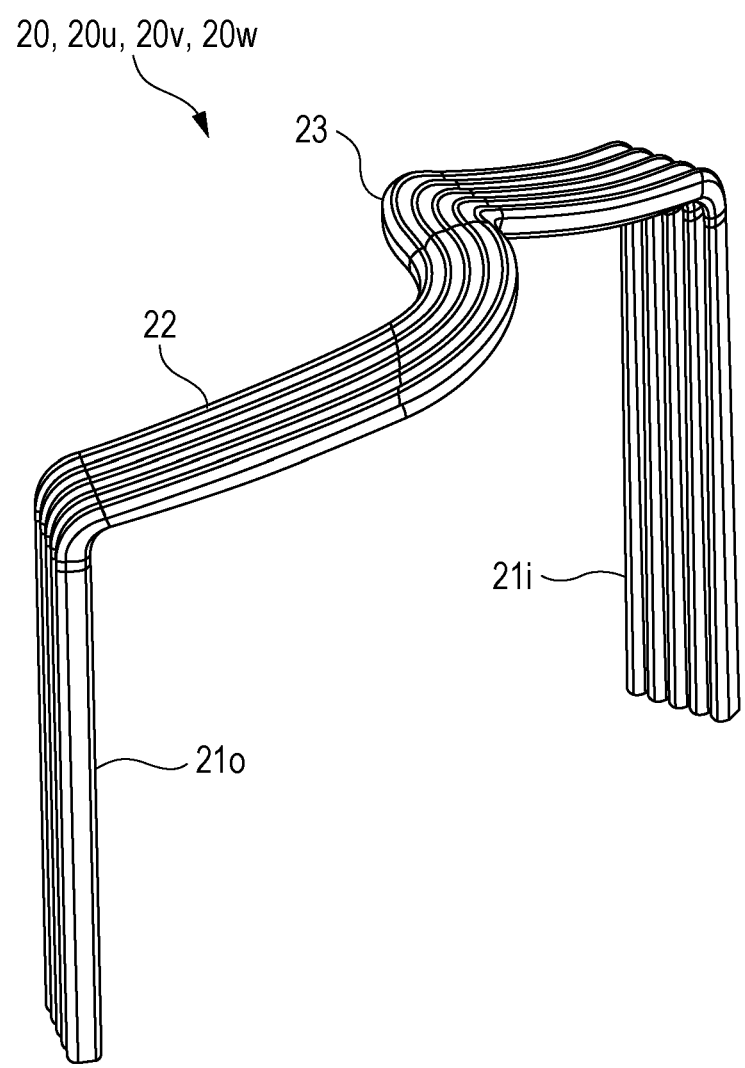
FIG. 3 is a perspective view of a coil segment which forms a stator coil.
Figure 4:
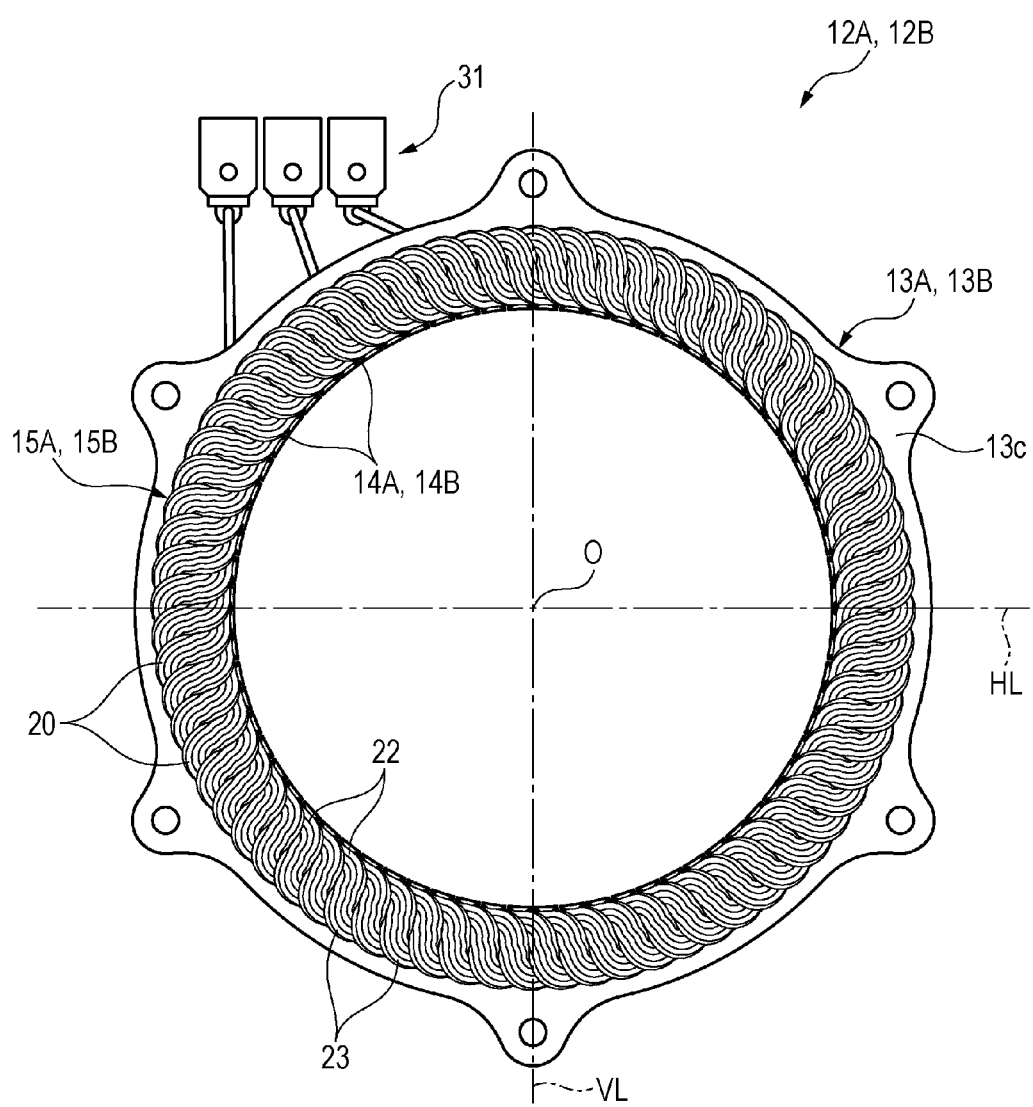
FIG. 4 is a view of a power generator and a drive motor as seen from a connection section side of the coil segment.

The generator 10A and the motor 10B are segment coil type rotary electric machines, and, as shown in FIG. 3, the stator coils 15A, 15B include a plurality of substantially U-shaped coil segments 20 formed of a pair of legs 21*i*, 21*o* and a connection section 22 that connects the legs 21*i*, 21*o* at each end. The plurality of coil segments 20 are formed of a bundle of a predetermined number of lead wires having a rectangular cross-section (flat wires) which are arranged in a line with surfaces having a larger width facing each other, and are inserted into the slots 14A, 14B. Further, an S-shaped curved section 23 having an S-shape in the arrangement direction is formed at the center of the connection section 22 such that one leg 21*i* is inserted into the radially inner portion of the slots 14A, 14B and the other leg 21*o* is inserted into the radially outer portion of the slots 14A, 14B.

Figure 5:
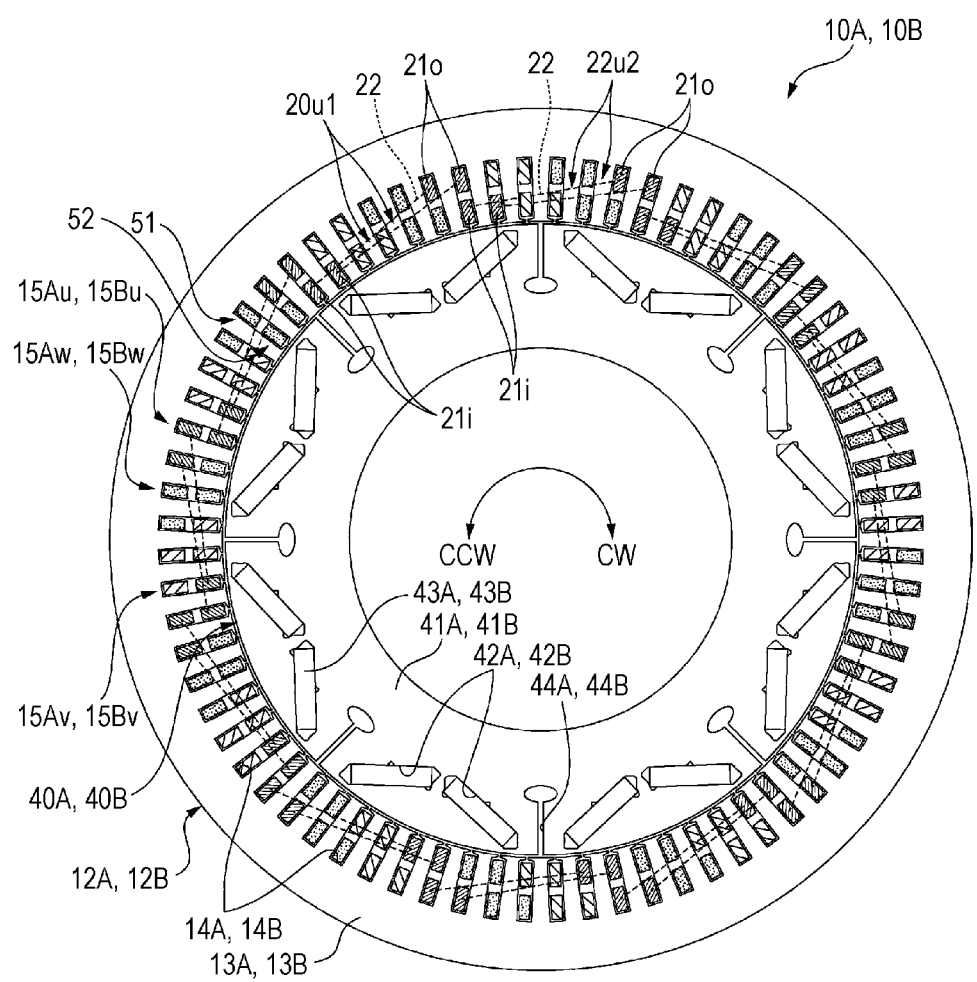
FIG. 5 is a sectional view taken along the line V-V of the power generator, the line V'-V' of the drive motor shown in FIG. 2.

As shown in FIG. 5, in the stator coils 15A, 15B, the pair of legs 21*i*, 21*o* extend through the slots 14A, 14B with a plurality of connection sections 22 being disposed on one surface 13*c* of the stator cores 13A, 13B and projecting portions 21*a* of the legs 21*i*, 21*o* that project from the slots 14A, 14B are folded in the circumferential direction to connect the corresponding legs on the other surface 13*d* of the stator cores 13A, 13B so that a distributed winding is formed.

Specifically, referring to FIG. 5, in the U-phase stator coils 15Au, 15Bu, for example, a pair of coil segments 20*u*1 are inserted from one surface 13*c* of the stator cores 13A, 13B, and one leg 21*i* of the pair of coil segments 20*u*1 is disposed on the inner peripheral side of two adjacent slots 14A, 14B, while the other leg 21*o* of the pair of coil segments 20*u*1 is disposed on the outer peripheral side of the two slots 14A, 14B which are separated from the slots 14A, 14B into which one leg 21*i* is inserted by 5 slots in the clockwise direction.

Further, one leg 21*i* of another pair of coil segments 20*u*2 is inserted into the inner peripheral side of the two slots 14A, 14B which are separated from the slots 14A, 14B into which the other leg 21*o* of the pair of coil segment 20*u*1 is inserted into the outer peripheral side by 1 slot in the clockwise direction, while the other leg 21*o* of the pair of coil segments 20*u*2 is inserted into the outer peripheral side of two slots 14A, 14B which are separated from the slots 14A, 14B into which one leg 21*i* is inserted by 5 slots in the clockwise direction. Further, 12 pairs of coil segments 20*u* are inserted into corresponding slots 14A, 14B of the stator cores 13A, 13B in the same manner.

Then, the legs 21*i*, 21*o* of the coil segments 20*u* which extend from the other surface 13*d* of the stator core 13A, 13B are folded in the circumferential direction to connect the corresponding legs so that the coil segments 20*u* are connected in an annular shape and a distributed winding of the U-phase stator coils 15Au, 15Bu is formed.

The U-phase stator coils 15Au, 15Bu which are connected in this manner include outer peripheral winding sections (outer peripheral windings) 51 which are housed in the outer peripheral side of a predetermined number of the slots 14A, 14B and inner peripheral winding sections (inner peripheral windings) 52 which are housed in the inner peripheral side of a predetermined number of the slots 14A, 14B. The outer peripheral winding section 51 and the inner peripheral winding section 52 share one of the slots 14A, 14B, and the inner peripheral winding sections 52 are disposed so as to be shifted with respect to the outer peripheral winding sections 51 by 1 slot in the clockwise direction. That is, one leg 21*i* of the coil segment 20*u* forms the inner peripheral winding section 52 and the other leg 21*o* forms the outer peripheral winding section 51, and the inner peripheral winding sections 52 are disposed so as to be shifted with respect to the outer peripheral winding section 51 by 1 slot in the clockwise direction.

Then, 12 pairs of the V-phase coil segments 20*v* and 12 pairs of the W-phase coil segments 20*w* are also inserted into the slots 14A, 14B in the same manner as 12 pairs of the U-phase coil segments 20*u* are inserted, and the legs 21*i*, 21*o* which extend from the slot 14A, 14B are folded in the circumferential direction to connect the corresponding legs 21*i*, 21*o* so that the V-phase and W-phase stator coils 15Av, 15Bv and 15Aw, 15Bw are formed.

Accordingly, similarly to the U-phase stator coils 15Au, 15Bu, the V-phase stator coils 15Av, 15Bv and the W-phase stator coils 15Aw, 15Bw also include the outer peripheral winding sections 51 which are housed in the outer peripheral side of a predetermined number of the slots 14A, 14B and the inner peripheral winding sections 52 which are housed in the inner peripheral side of a predetermined number of the slots 14A, 14B. Further, the outer peripheral winding section 51 and the inner peripheral winding section 52 share one of the slots 14A, 14B, and the inner peripheral winding sections 52 are disposed so as to be shifted with respect to the outer peripheral winding sections 51 by 1 slot in the clockwise direction in FIG. 6.

The stator 12A of the generator 10A and the stator 12B of the motor 10B have the same configuration except for their lengths in the axis direction (thickness). That is, the stators 12A, 12B have the same configuration including the manner of winding of the stator coils 15A, 15B except for the widths in the axis direction of the stator cores 13A, 13B, and thus the lengths in the axis direction of the leg 21 of the coil segment 20. The lengths in the axis direction of the stators 12A, 12B may be the same, in which case, the stators 12A, 12B are formed as identical stators.

Further, power distributing members 24A, 24B that allow for connection of the corresponding legs 21 of the coil segments 20 of the respective phases or middle point connection are disposed on the other surface 13*d* of the stator cores 13A, 13B. The power distributing members 24A, 24B have a plurality of elongated conductive metal plates formed in a curved shape and disposed so as to extend outward in the axis direction with respect to connection portions 21*b* of the coil segments 20.

Figure 6A:
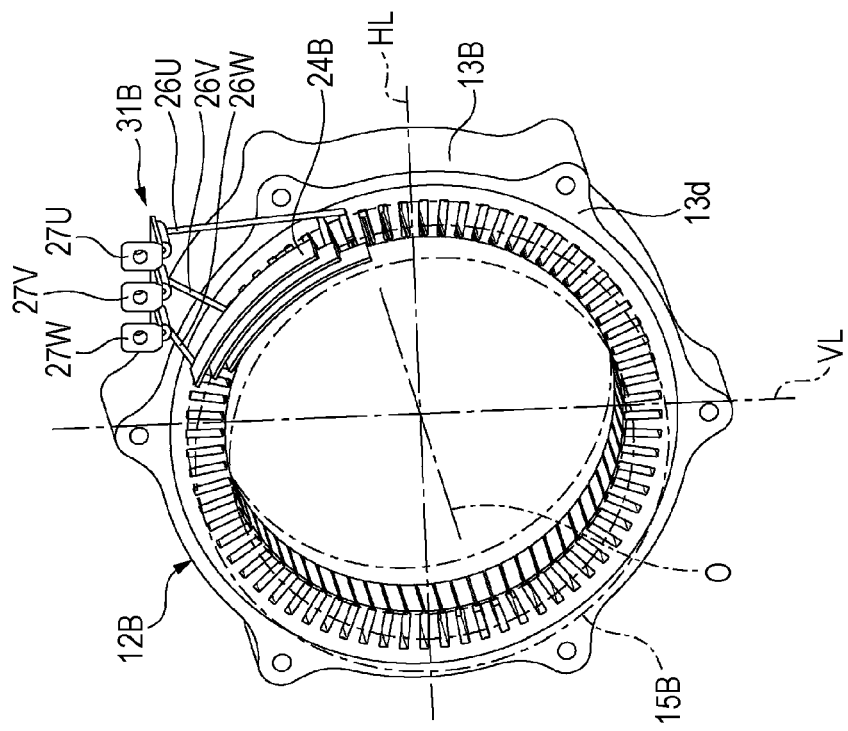
FIG. 6A is a perspective view of the stator of the power generator.
Figure 6B:
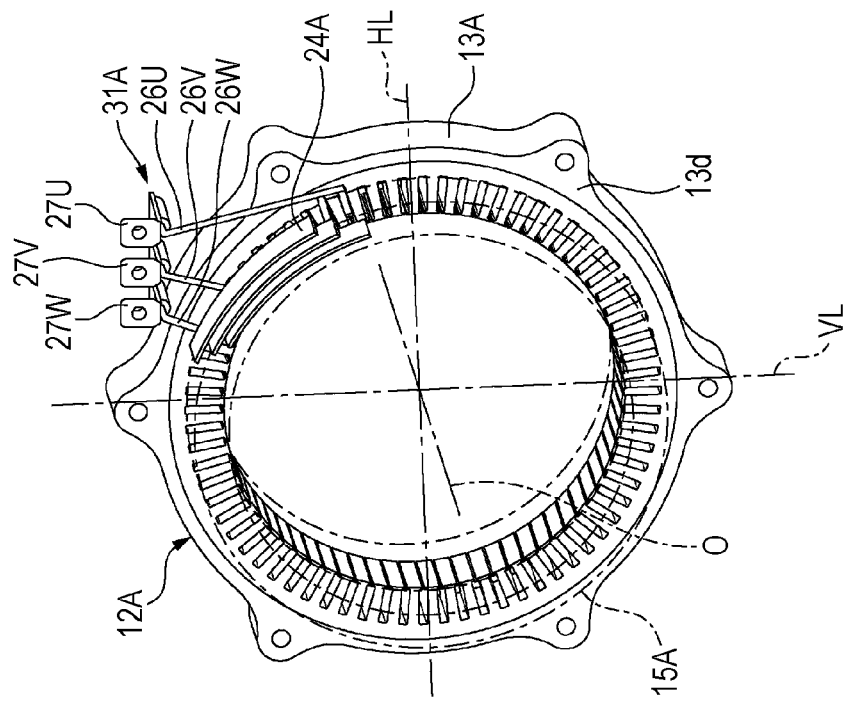
FIG. 6B is a perspective view of the stator of the drive motor.

As shown in FIG. 6, the power distributing members 24A, 24B as seen from the other surface 13*d* of the stator cores 13A, 13B are disposed on the right-hand side with respect to a line segment VL which extends in the vertical direction through a rotation axis O of the stators 12A, 12B and on the upper side with respect to a line segment HL which extends in the horizontal direction through the rotation axis O of the stators 12A, 12B.

The stators 12A, 12B are disposed such that the sides on which the connection portions 21b of the legs 21 of the corresponding coil segments 20 are disposed, that is, the other surfaces 13d of the stator cores 13A, 13B face each other.

Accordingly, as shown in FIG. 2, the power distributing members 24A, 24B are disposed between the stator 12A and the stator 12B in the rotation axis direction and apart from each other in the circumferential direction.

As shown in FIGS. 1 and 2, power terminal blocks 28A, 28B are disposed on the upper side of the casing 11, and the power terminal block 28A is electrically connected to the stator coil 15A of the stator 12A via a wiring member 31A made up of three wires (U-phase, V-phase, W-phase) and the power terminal block 28B is electrically connected to the stator coil 15B of the stator 12B via a wiring member 31B made up of three wires (U-phase, V-phase, W-phase).

Similarly to the power distributing members 24A, 24B, the wiring members 31A, 31B as seen from the other surface 13d of the stator cores 13A, 13B are disposed on the right-hand side with respect to the line segment VL and on the upper side with respect to the line segment HL.

Furthermore, similarly to the power distributing members 24A, 24B, the stators 12A, 12B are disposed such that the other surfaces 13d of the stator cores 13A, 13B face each other, and accordingly, the wiring members 31A, 31B are disposed between the stator 12A and the stator 12B in the rotation axis direction (see FIG. 2). Further, the wiring members 31A, 31B as seen from the rotation axis direction are disposed on each side with respect to the line segment VL which extends in the vertical direction through the rotation axis O of the stators 12A, 12B and on the upper side with respect to the line segment HL which extends in the horizontal direction through the rotation axis O of the stators 12A, 12B (see FIG. 1).

The wiring members 31A, 31B include lead wires 26U, 26V, 26W and connection terminals 27U, 27V, 27W, respectively. The connection terminals 27U, 27V, 27W of the wiring members 31A, 31B are connected to terminals (not shown in the figure) which are disposed on inner connecting sections 29A, 29B of the power terminal blocks 28A, 28B. Further, external terminals (not shown in the figure) which are conductive with terminals of the connecting section 29A, 29B are disposed on outer connecting sections 30A, 30B of the power terminal blocks 28A, 28B which extend to the outside from the casing 11 and are connected to external devices via conductive cables, which are not shown in the figure.

Further, as shown in FIG. 5, the rotors 40A, 40B are rotatably disposed in the stators 12A, 12B via a gap and include rotor cores 41A, 41B which are formed by stacking a plurality of magnetic steel sheets having the same disc shape and a plurality of permanent magnets 43A, 43B which are embedded in a plurality of magnet insertion holes 42A, 42B formed in the rotor cores 41A, 41B by using filler.

The plurality of magnet insertion holes 42A, 42B are disposed to form substantially V shapes which are open toward the outer periphery of the rotor cores 41A, 41B, and the V shapes are arranged at predetermined intervals. The permanent magnets 43A, 43B are inserted in the magnet insertion holes 42A, 42B, respectively, such that magnetic poles in each of the magnet insertion holes 42A, 42B are opposite to each other. Further, voids 44A, 44B are disposed between the adjacent pairs of magnet insertion holes 42A, 42B so as to prevent short circuit of magnetic flux.

When the rotor 40A of the generator 10A having the above configuration rotates, power generation torque generated in a direction opposite to the rotation direction of the rotor 40A generates regenerative electric power in the stator coil 15A and allows for operation as a generator. Further, when electric current is supplied to the stator coil 15B of the motor 10B, actuation torque is generated in the rotor 40B and allows for operation as a motor.

In this embodiment, the generator 10A is configured such that the shift direction of the inner peripheral winding sections 52 with respect to the outer peripheral winding sections 51 and the direction of the power generation torque generated during energy regeneration are the same, while the motor 10B is configured such that the shift direction of the inner peripheral winding sections 52 with respect to the outer peripheral winding sections 51 and the direction of the actuation torque generated during actuation are opposite to each other.

Figure 7A:
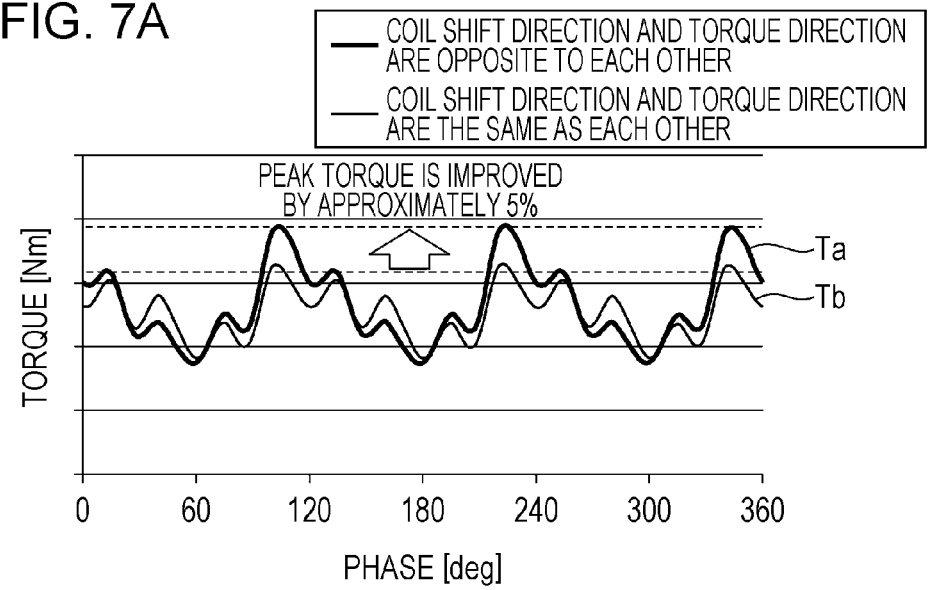
FIG. 7A is a chart which shows a torque property of the drive motor and the power generator.

That is, as shown in FIG. 7A, the actuation torque property of the rotary electric machine having the stator coil wound in the above described manner is different depending on the direction of the actuation torque to be generated. For example, the actuation torque property when the actuation torque in a direction (the arrow CCW direction in FIG. 6) opposite to the shift direction of the stator coil (the shift direction of the inner peripheral winding sections 52 with respect to the outer peripheral winding sections 51) is generated by supplying electric current to the stator coil is shown as a curve Ta, while the actuation torque property when the actuation torque in the forward direction (the arrow CW direction in FIG. 6) with respect to the shift direction of the stator coil is shown as a curve Tb. The maximum torque of the curve Ta is larger than the maximum torque of the curve Tb by approximately 5%, and this allows for improvement of acceleration performance and is advantageous for use as the drive motor 10B for vehicles.

Figure 7B:
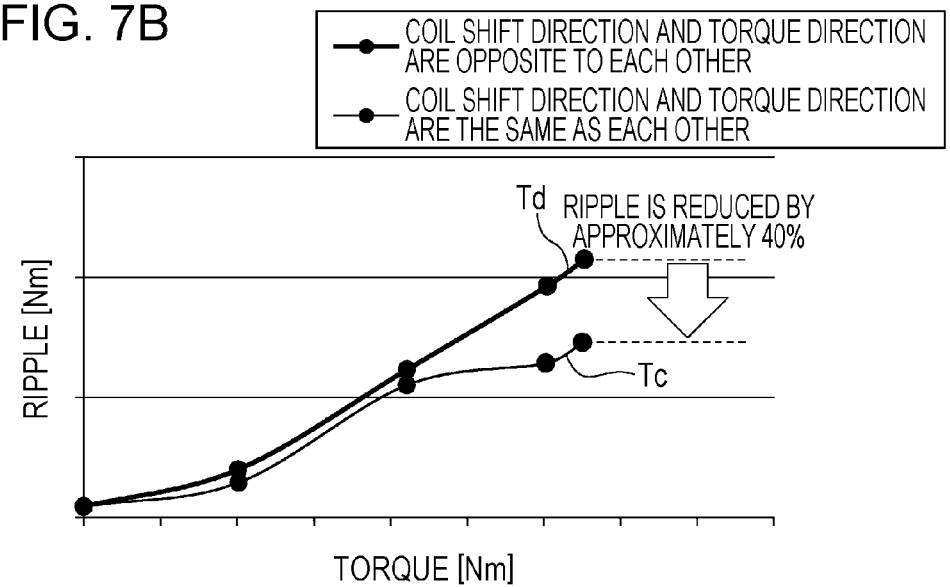
FIG. 7B is a chart which shows the relationship between torque and ripple of the drive motor and the power generator.

Furthermore, as shown in FIG. 7B, the torque property (the magnitude of ripple) of the rotary electric machine having the stator coil wound in the above described manner differs in accordance with the rotation direction of the rotor. The torque property when the power generation torque in the same direction (the arrow CW direction in FIG. 6) as the shift direction of the stator coil is generated in the stator coil is shown as a curve Tc, while the torque property when the power generation torque in a direction (the arrow CCW direction in FIG. 6) opposite to the shift direction of the stator coil is generated is shown as a curve Td. The ripple of the torque property of the curve Tc is decreased by approximately 40% compared with that of the torque property of the curve Td, and this is advantageous for use as the power generator 10A which needs to operate quietly.

Accordingly, different required properties for the generator 10A and the motor 10B can be satisfied by the rotary electric machines having the same cross-sectional shape of the electromagnetic section, since the power generation torque in the same direction as the shift direction of the stator coil 15A is generated in the generator 10A and the actuation torque in a direction opposite to the shift direction of the stator coil 15B is generated in the motor 10B.

Furthermore, in the arrangement of the generator 10A and the motor 10B of this embodiment shown in FIG. 2, a rotation direction R1 during power generation of the rotor 40A and a rotation direction R2 during actuation of the rotor 40B are opposite to each other.

As described above, according to the rotary electric machine unit 10 of this embodiment, each of a plurality of phases of the stator coils 15 includes the outer peripheral winding sections 51 which are housed in the outer peripheral side of a predetermined number of the slots 14, and the inner peripheral winding sections 52 which are housed in the inner peripheral side of a predetermined number of the slots 14. The outer peripheral winding section 51 and the inner peripheral winding section 52 share the same slot 14, and the inner peripheral winding sections 52 are disposed so as to be shifted with respect to the outer peripheral winding sections 51 by at least 1 slot in a predetermined direction. The generator 10A is configured such that the shift direction of the inner peripheral winding sections 52 with respect to the outer peripheral winding sections 51 and the direction of the power generation torque generated during energy regeneration are the same, and the motor 10B is configured such that the shift direction of the inner peripheral winding sections 52 with respect to the outer peripheral winding sections 51 and the direction of the actuation torque generated during actuation are opposite to each other. Accordingly, since the stators 12A, 12B having the same cross-sectional shape of the electromagnetic section are used for the generator 10A and the motor 10B, the stator coils 15A, 15B are wound in the same manner, can be easily produced and can improve performance, regardless of difference in the length of the generator 10A and the motor 10B in the axis direction. In addition to that, different required torque properties for the generator 10A and the motor 10B can be simultaneously satisfied.

Further, since the stator 12A of the generator 10A and the stator 12B of the motor 10B are disposed on the same axis so as to face each other, the stators 12A, 12B having the same cross-sectional shape of the electromagnetic section can be used for the generator 10A and the motor 10B, and different torque properties can be simultaneously satisfied by using the conventional control method by simply changing the arrangement of the stators 12A, 12B.

Further, the power distributing members 24A, 24B may be disposed between the generator 10A and the motor 10B in the axis direction so that the power distributing members 24A, 24B may be formed of shared components, thereby decreasing the number of parts and reducing the cost.

The present disclosure is not limited to the foregoing embodiment, and modification, improvement and the like can be made as appropriate. Although a hybrid vehicle has been described as an application vehicle, the disclosure is not limited thereto. For example, an electric vehicle which uses only a motor as a drive source may be used. Further, although the stator coil has been described as being formed of the coil segments, the disclosure is not limited thereto. Any type of coil can be used as long as it is possible to use a similar winding method. In the present embodiment, although the power distributing members are disposed between the drive motor and the power generator in the axis direction, the disclosure is not limited thereto. For example, the power distributing members can be disposed on the same side with respect to the stator core in the axis direction.

According to a first aspect of the embodiment, a rotary electric machine unit (for example, a rotary electric machine unit 10 in the embodiment described above) that includes two rotary electric machines, which are a drive motor (for example, a motor 10B in the embodiment described above) and a power generator (for example, a generator 10A in the embodiment described above), each rotary electric machine includes a stator (for example, a stator 12A and a stator 12B in the embodiment described above) that includes a stator core (for example, a stator core 13A and a stator core 13B in the embodiment described above) having a plurality of slots (for example, slots 14A, 14B in the embodiment described above) which penetrate in an axis direction and are disposed in a circumferential direction with a predetermined interval therebetween, and stator coils (for example, stator coils 15A, 15B in the embodiment described above) of a plurality of phases that are each disposed in the plurality of slots as a distributed winding, wherein the stator coils of the respective phases include outer peripheral winding sections (for example, outer peripheral winding sections 51 in the embodiment described above) which are housed in an outer peripheral side of a predetermined number of the slots and inner peripheral winding sections (for example, inner peripheral winding sections 52 in the embodiment described above) which are housed in an inner peripheral side of a predetermined number of the slots, the outer peripheral winding section and the inner peripheral winding section share the slot and the inner peripheral winding sections are shifted with respect to the outer peripheral winding sections by at least 1 slot in a predetermined direction (for example, a clockwise direction in the embodiment described above) as seen from one side in the axis direction (for example, the other surface 13d of the stator core 13A, 13B in the embodiment described above), the drive motor is configured such that a shift direction of the stator coils and a torque direction of the drive motor are opposite to each other, and the power generator is configured such that the shift direction of the stator coils and a torque direction of the power generator are the same as each other.

According to a second aspect of the embodiment, in addition to the first aspect of the embodiment, the stator of the drive motor and the stator of the power generator are disposed on the same rotation axis so as to face each other.

According to a third aspect of the embodiment, in addition to the first or second aspect of the embodiment, the stator coil is formed of coil segments (for example, coil segments 20 in the embodiment described above), and a power distributing member (for example, a power distributing member 24A, 24B in the embodiment described above) for supplying electric power to the stator coil of the drive motor and the power generator is disposed between the drive motor and the power generator in the axis direction.

According to a first aspect of the embodiment, since the stators having the same cross-sectional shape of the electromagnetic section are used for the drive motor and the power generator, performance can be improved and different required torque properties for the drive motor and the power generator can be simultaneously satisfied.

According to a second aspect of the embodiment, the stators having the same cross-sectional shape of the electromagnetic section can be used for drive motor and the power generator, and different torque properties can be simultaneously satisfied by using the conventional control method by simply changing the arrangement of the stators.

According to a third aspect of the embodiment, the power distributing member may be disposed between the drive motor and the power generator so that the power distributing member may be shared by the drive motor and the power generator, thereby reducing the cost.

Obviously, numerous modifications and variations of the present invention are possible in light of the above teachings. It is therefore to be understood that within the scope of the appended claims, the invention may be practiced otherwise than as specifically described herein.

What is claimed is:

1. A rotary electric machine unit that includes two rotary electric machines, which are a drive motor and a power generator, each rotary electric machine comprising:
a stator that includes a stator core having a plurality of slots which penetrate in an axis direction and are disposed in a circumferential direction with a predetermined interval therebetween, and stator coils of a plurality of phases that are each disposed in the plurality of slots as a distributed winding, wherein the stator coils of the respective phases include outer peripheral winding sections which are housed in an outer peripheral side of a predetermined number of the slots and inner peripheral winding sections which are housed in an inner peripheral side of a predetermined number of the slots, the outer peripheral winding section and the inner peripheral winding section share the slot and the inner peripheral winding sections are shifted with respect to the outer peripheral winding sections by at least 1 slot in a predetermined direction as seen from one side in the axis direction, the drive motor is configured such that a shift direction of the stator coils and a torque direction of the drive motor are opposite to each other, and the power generator is configured such that the shift direction of the stator coils and a torque direction of the power generator are the same as each other.

2. The rotary electric machine unit according to claim 1, wherein the stator of the drive motor and the stator of the power generator are disposed on the same rotation axis so as to face each other.

3. The rotary electric machine unit according to claim 1, wherein the stator coil is formed of coil segments, and a power distributing member for supplying electric power to the stator coil of the drive motor and the power generator is disposed between the drive motor and the power generator in the axis direction.

4. A rotary electric machine apparatus comprising:
a drive motor; and
a power generator, the drive motor and the power generator each comprising:
a stator comprising:
a stator core having a plurality of slots which extend through the stator in an axis direction of the stator and which are disposed in a circumferential direction of the stator with a predetermined interval; and stator coils for a plurality of phases each disposed in the plurality of slots as a distributed winding, the stator coils including outer peripheral windings housed in an outer peripheral side of a predetermined number of the plurality of slots and inner peripheral windings housed in an inner peripheral side of a predetermined number of the plurality of slots, the outer peripheral windings and the inner peripheral windings sharing the plurality of slots, the inner peripheral windings being shifted with respect to the outer peripheral windings by at least one slot in a predetermined direction as seen from one side in the axis direction, the drive motor being provided such that a shift direction of the stator coils and a torque direction of the drive motor are opposite to each other, the power generator being provided such that the shift direction of the stator coils and a torque direction of the power generator are a same as each other.

5. The rotary electric machine apparatus according to claim 4, wherein
the stator of the drive motor and the stator of the power generator are disposed on a same rotation axis so as to face each other.

6. The rotary electric machine apparatus according to claim 4, wherein
the stator coils comprise coil segments, and a power distributing member for supplying electric power to the stator coils of the drive motor and the power generator is disposed between the drive motor and the power generator in the axis direction.

7. The rotary electric machine apparatus according to claim 6, wherein
the power distributing member comprises a first power distributing member for supplying electric power to the stator coils of the drive motor and a second power distributing member for supplying electric power to the stator coils of the power generator, and the first power distributing member and the second power distributing member are disposed apart from each other in the circumferential direction.

* * * * *